(12) United States Patent
Ghosh et al.

(10) Patent No.: US 9,836,487 B2
(45) Date of Patent: Dec. 5, 2017

(54) SYSTEM AND METHOD FOR ENSURING CODE QUALITY COMPLIANCE FOR VARIOUS DATABASE MANAGEMENT SYSTEMS

(71) Applicant: Cognizant Technology Solutions India Pvt. Ltd., Chennai (IN)

(72) Inventors: Nirmalya Ghosh, Kolkata (IN);
Abhisek Banerjee, Kolkata (IN);
Anirban Ghosh, Kolkata (IN);
Somenath Dhar, Kolkata (IN);
Subimal Nath, Hooghly (IN);
Mohammad Mazharuddin, Kolkata (IN); Avirup Ghatak, Kolkata (IN);
Radhika Kallu, Guntur (IN); Sankara Iyer Srilakshmi, Chennai (IN)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 452 days.

(21) Appl. No.: 14/536,840

(22) Filed: Nov. 10, 2014

(65) Prior Publication Data
US 2016/0026648 A1    Jan. 28, 2016

(30) Foreign Application Priority Data
Jul. 28, 2014    (IN) ............................ 3679/CHE/2014

(51) Int. Cl.
*G06F 17/30*    (2006.01)
(52) U.S. Cl.
CPC .............................. *G06F 17/30289* (2013.01)

(58) Field of Classification Search
CPC .................................................. G06F 17/30082
USPC ...... 705/3, 2, 31, 317, 4, 1.1, 30, 7.11, 7.23, 705/7.32, 7.33, 14.36, 14.38, 14.73, 21, 705/26.7, 28, 318, 36 R, 37, 38, 39, 40, 705/408, 44, 7.12, 7.16, 7.28, 7.29, 7.31,
(Continued)

(56) References Cited

U.S. PATENT DOCUMENTS 8,005,803 B2    8/2011   Graefe
2005/0289115 A1   12/2005  Garden
(Continued)

FOREIGN PATENT DOCUMENTS

GB          2490702 A  * 11/2012 .......... G06F 11/3604

*Primary Examiner* — Jay Morrison
*Assistant Examiner* — Ken Hoang
(74) *Attorney, Agent, or Firm* — Cantor Colburn LLP

(57) ABSTRACT

A system and computer-implemented method for ensuring code quality compliance for one or more Database Management Systems (DBMSs) is provided. The system comprises a user interface configured to prompt one or more users to select one or more options and provide information for configuring rules corresponding to coding standards and best practices. The system further comprises a rules registration module to register the configured rules in a repository for validation. Furthermore, the system comprises a source selector to provide options to the one or more users to select one or more DBMSs and a source manager to fetch database code from the one or more selected DBMSs. In addition, the system comprises one or more parsers to parse the fetched database code, a validator to validate the parsed code using the registered rules and a report manager to provide results of the validation to the one or more users.

23 Claims, 5 Drawing Sheets

(58) Field of Classification Search
USPC ......... 705/7.37, 7.39, 7.42; 726/1, 28, 3, 30;
707/E17.014, E17.005, E17.015, E17.032,
707/E17.044, 602, E17.007, E17.009,
707/607, 770, 999.004, E17.01, E17.012,
707/E17.016, 654, 694, 703, 722, 736,
707/769, 783, 803, 804, 822, 912, 955,
707/999.003, 999.01, 999.107; 717/121,
717/106, 109, 110, 113, 123, 124, 128,
717/131, 172
See application file for complete search history.

(56) References Cited

U.S. PATENT DOCUMENTS

| | | | |
|---|---|---|---|
| 2007/0016544 A1* | 1/2007 | Graefe | G06F 17/30587 |
| 2010/0023928 A1 | 1/2010 | Hentschel | |
| 2012/0291018 A1* | 11/2012 | Peri | G06F 8/77 |
| | | | 717/126 |
| 2013/0117323 A1* | 5/2013 | Lohiya | G06F 17/30539 |
| | | | 707/793 |
| 2013/0311419 A1* | 11/2013 | Xing | G06N 5/048 |
| | | | 706/55 |
| 2015/0293834 A1* | 10/2015 | Potdar | G06F 8/30 |
| | | | 717/131 |

\* cited by examiner

SYSTEM AND METHOD FOR ENSURING CODE QUALITY COMPLIANCE FOR VARIOUS DATABASE MANAGEMENT SYSTEMS

FIELD OF THE INVENTION

The present invention relates generally to code quality compliance. More particularly, the present invention provides a system and method for ensuring database code quality compliance for various database management systems.

BACKGROUND OF THE INVENTION

Organizations developing software applications are exposed to huge financial as well as technical risk due to poor quality of coding during application development. Usually, quality of code suffers due to non compliance to best practices and coding standards. For developing applications, coding is often done using major coding technologies such as Java and .Net. While programming using the above mentioned technologies, developers adhere to coding standards using vendor provided development studio, various third party tools and open source tools. For database programming, most Database Management Systems (DBMSs) have language editors to facilitate developers to write database code for interacting with the DBMSs.

Conventionally, various systems and methods exist for ensuring code quality compliance while programming for various DBMSs. For example, developers use their own expertise and skill to write database code and apply a particular coding option in a specific scenario. Also, different developers follow different coding practices and have a choice to opt for the best coding option as perceived by them. This personal choice results in different standards of coding even amongst the same team. Further, as most DBMS vendors do not provide assistance and guidance for implementing coding best practices while writing database code, the organization are increasingly dependent on human expertise and experience to ensure coding standards are met.

To overcome the abovementioned disadvantages, third party solutions exist that facilitate compliance to coding standards for maintaining code quality. Examples of such third party solutions include, but not limited to, TOAD and clearSQL. These third party solutions can support multiple DBMS platforms individually. However, these solutions do not support multiple DBMSs simultaneously even though majority of software developing organizations have heterogeneous DBMS environment. Also, the above-mentioned third party solutions do not allow customizing and setting up organization specific best coding practices into these solutions.

In light of the above, there is a need for a system and method that provides uniform coding standards and best practices across the organization. Further, there is a need for a system and method that facilitates the software development organizations to configure their own coding standards and best practices without any coding effort. Furthermore, there is a need for a system and method that facilitate supervising code quality compliance for various DBMSs of the software developing organization simultaneously through a single platform. Also, there is a need for a system and method that facilitate project teams to validate the database code against best practices and coding standards automatically during development thereby exposing defects early in the software development life cycle. Moreover, there is a need for a system and method that provides milestone trend analysis to facilitate the project teams in automatically ensuring improvement in coding standards and quality compliance. In addition, there is a need for a system and method that provide database coding health reports from time to time for better decision making. Further, there is a need to facilitate the software developing organizations in delivering database centric software applications in a time and cost efficient manner by ensuring compliance during all stages of software development and avoiding rework. Furthermore, there is a need for a system and method that can be integrated with the DBMS language editor.

SUMMARY OF THE INVENTION

A system and computer-implemented method for ensuring code quality compliance for one or more database management systems is provided. The system comprises a user interface configured to prompt one or more users to select one or more options and provide information for configuring one or more rules corresponding to coding standards and best practices, wherein the information for configuring the one or more rules comprise at least one of: rule scope, rule type and one or more functions. The system further comprises a rules registration module configured to register the one or more configured rules in a repository for validation. Furthermore, the system comprises a source selector configured to provide options to the one or more users to select one or more database management systems. Also, the system comprises a source manager configured to fetch database code from the one or more selected database management systems. In addition, the system comprises one or more parsers configured to parse the fetched database code. The system further comprises a validator configured to validate the parsed code using the one or more registered rules, wherein validation comprises identifying one or more sections of the parsed code on which the one or registered rules are to be applied based on the rule scope and the rule type and applying the one or more functions associated with the one or more registered rules to the one or more identified sections. The system further comprises a report manager configured to provide results of the validation, via the user interface, to the one or more users.

In an embodiment of the present invention, the one or more users are prompted to select the one or more options for: defining the rule type, defining the rule scope, constructing the one or more rules using the one or more functions, checking syntax, checking semantics, providing message description and registering rules. In an embodiment of the present invention, the database code is written by one or more developers developing one or more database centric applications for the one or more database management systems. In an embodiment of the present invention, the rule scope defines range within the database code to which a particular rule has to be applied and further wherein the rule scope comprises at least one of: entire database code, a block and a statement. In an embodiment of the present invention, the rule type defines one or more target objects within the database code for applying a particular rule. In an embodiment of the present invention, the rule type comprises at least one of: procedures, functions, parameters, variable declarations, select statements, insert statements, update statements, delete statements, a particular set of statements, exception, tables, application error statements, loops, conditional statements, cursor and dynamic Structured Query Languages (SQLs) within the database code.

In an embodiment of the present invention, the one or more functions are a set of library functions that are pre-stored and are used by the one or more users for configuring the one or more rules via the user interface. In an embodiment of the present invention, the one or more functions include at least one of: text functions, arithmetic functions, lookup functions, logical functions, set functions and statistical functions. In an embodiment of the present invention, the results of the validation comprise at least one of: bugs, errors, defects, flaws and faults in the validated code. In an embodiment of the present invention, the results of the validation are provided to the one or more users in the form comprising at least one of: reports, pivot table analysis, trend analysis, dashboard view, charts, graphs, statistics, error warnings, error location in the code and informational messages. In an embodiment of the present invention, parsing the fetched database codes comprises: segmenting the fetched database code into the one or more sections and assigning identification tokens to each of the one or more sections, wherein the identification tokens facilitate in identifying the one or more sections of the parsed code on which the one or registered rules are to be applied.

The computer-implemented method for ensuring code quality compliance for one or more database management systems, via program instructions stored in a memory and executed by a processor, comprises prompting one or more users to select one or more options and provide information for configuring one or more rules corresponding to coding standards and best practices, wherein the information for configuring the one or more rules comprise at least one of: rule scope, rule type and one or more functions. The computer-implemented method further comprises registering the one or more configured rules in a repository for validation. Furthermore, the computer-implemented method comprises providing options to the one or more users to select one or more database management systems. Also, the computer-implemented method comprises fetching database code from the one or more selected database management systems. In addition, the computer-implemented method comprises parsing the fetched database code. Further, the computer-implemented method comprises validating the parsed code using the one or more registered rules, wherein validation comprises identifying one or more sections of the parsed code on which the one or registered rules are to be applied based on the rule scope and the rule type and applying the one or more functions associated with the one or more registered rules to the one or more identified sections. The computer-implemented method further comprises providing results of the validation to the one or more users.

In an embodiment of the present invention, the step of parsing the fetched database code comprises: segmenting the fetched database code into the one or more sections and assigning identification tokens to each of the one or more sections, wherein the identification tokens facilitate in identifying the one or more sections of the parsed code on which the one or registered rules are to be applied.

A computer program product for ensuring code quality compliance for one or more database management systems is provided. The computer program product comprises a non-transitory computer-readable medium having computer-readable program code stored thereon, the computer-readable program code comprising instructions that when executed by a processor, cause the processor to prompt one or more users to select one or more options and provide information for configuring one or more rules corresponding to coding standards and best practices, wherein the information for configuring the one or more rules comprise at least one of: rule scope, rule type and one or more functions. The processor further registers the one or more configured rules in a repository for validation. Furthermore, the processor provides options to the one or more users to select one or more database management systems. The processor also fetches database code from the one or more selected database management systems and parses the fetched database code. In addition, the processor validates the parsed code using the one or more registered rules, wherein the step of validation comprises identifying one or more sections of the parsed code on which the one or registered rules are to be applied based on the rule scope and the rule type and applying the one or more functions associated with the one or more registered rules to the one or more identified sections. The processor further provides results of the validation to the one or more users.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

A system and method that ensures uniform coding standards and best practices across the organization is described herein. Further, the invention provides for a system and method that facilitates the software development organizations to configure their own coding standards and best practices without any coding effort using the conventional programing languages. Furthermore, the invention provides for a system and method that facilitate supervising code quality compliance for various database management systems of the software developing organization simultaneously through a single platform. Also, the invention provides for a system and method that facilitate project teams to validate the database code against best practices and coding standards during development thereby exposing defects early in the software development life cycle. Moreover, the invention provides for a system and method that provides milestone trend analysis feature to facilitate the project teams in automatically ensuring progressive improvement in coding standards and quality compliance. In addition, the invention provides for a system and method that provides database coding health reports from time to time for better decision making. The invention further provides for a system and method that facilitates software developing organizations in delivering database centric software applications in a time and cost efficient manner. Furthermore, the invention provides for a system and method that can be integrated with the database management systems.

The following disclosure is provided in order to enable a person having ordinary skill in the art to practice the invention. Exemplary embodiments are provided only for illustrative purposes and various modifications will be readily apparent to persons skilled in the art. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The present invention would now be discussed in context of embodiments as illustrated in the accompanying drawings.

Figure 1:
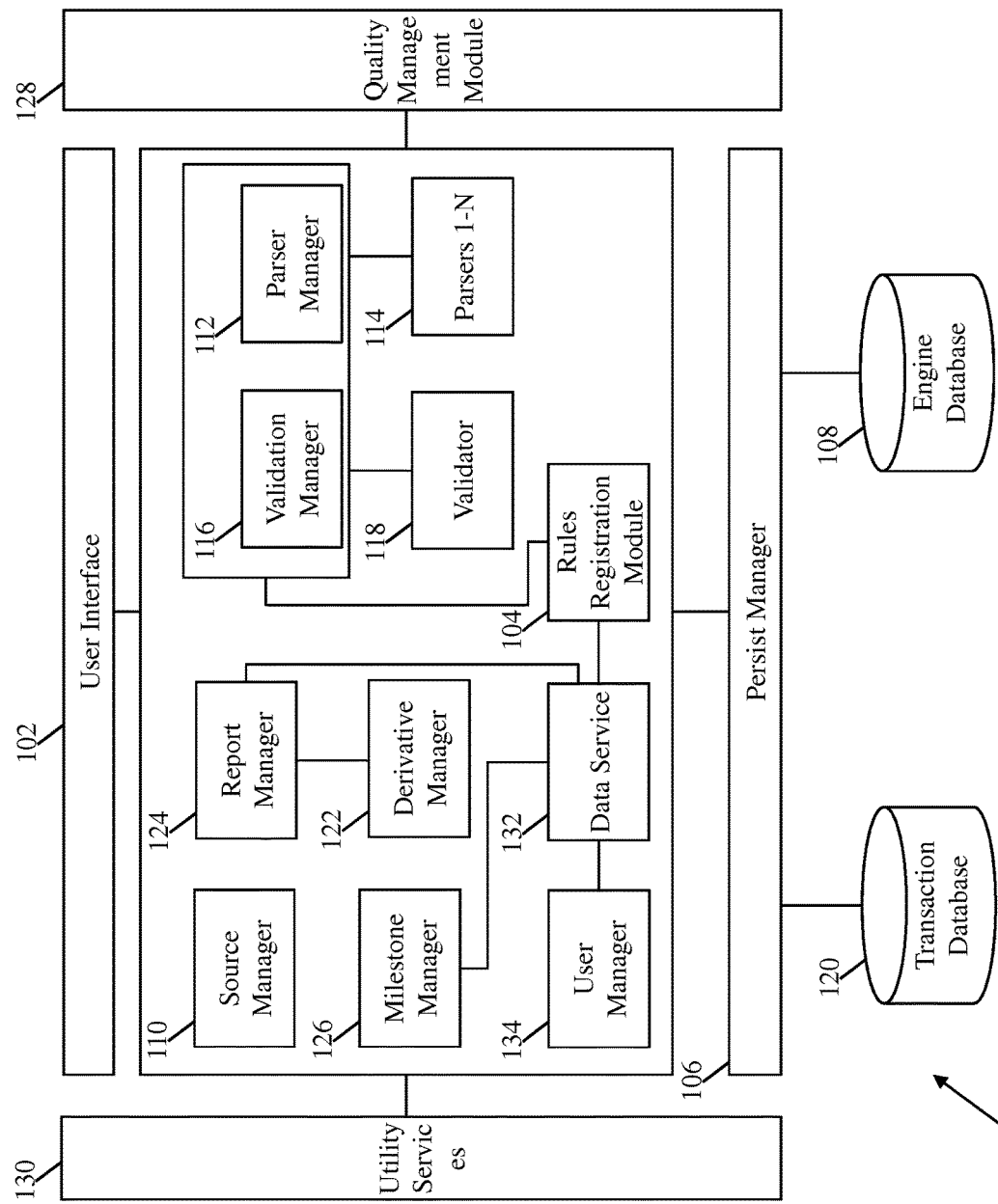
FIG. 1 is a block diagram illustrating a system for ensuring code quality compliance for various database management systems, in accordance with an embodiment of the present invention.

FIG. 1 is a block diagram illustrating a system for ensuring code quality compliance for various database management systems, in accordance with an embodiment of the present invention.

The system 100 comprises a user interface 102, a rules registration module 104, a persist manager 106, an engine database 108, a source manager 110, a parser manager 112, one or more parsers 114, a validation manager 116, a validator 118, a transaction database 120, a derivative manager 122, a report manager 124, a milestone manager 126, a quality management module 128, a utility services module 130, a data service 132 and a user manager 134.

The user interface 102 is configured to prompt one or more users to select one or more options and provide relevant information for configuring coding standards and best practices in the system 100. The coding standards and best practices are configured as one or more rules in the system 100 and used for ensuring code quality. The coding standards and the coding best practices originate by analyzing bugs and errors that were generated when previously written codes were implemented. On analysis, the bugs and errors are correlated to specific coding practices. The coding standards and the coding best practices are then recommended to overcome the analyzed bugs and errors while writing code for software applications.

In an embodiment of the present invention, the one or more users configuring the one or more rules in the system 100 include, but not limited to, Chief Technical Officer (CTO), system architects, Information Technology (IT) managers and project managers of the organization developing software application. In an embodiment of the present invention, the code includes, but not limited to, database code written by developers while coding and developing database centric software applications for an organization. The database code written is used for interacting with one or more databases. The one or more databases include, but not limited to, one or more Database Management Systems (DBMSs). Further, the DBMS language editors facilitate developers to write database codes. In an embodiment of the present invention, the one or more DBMSs include, but not limited to, Oracle, SQL server, Sybase and DB2. The Oracle DBMS provides Oracle SQL developer that has an Oracle client to facilitate the developers to write the database codes. Similarly, the SQL server provides Microsoft SQL server Management Studio that has an SQL server client. The developers using the Microsoft SQL server write the database code using Transact SQL. The Transact SQL is a programming language for the SQL server. Sybase provides SAP Sybase SQL advantage editor having a Sybase client for writing database code for the Sybase DBMS. The DB2 provides IBM DB2 command editor having IBM DB2 client. Each of the one or more clients provided by the abovementioned database language editors are enabled to check syntax and basic coding standards such as indentation of the database code written for these DBMSs.

In an embodiment of the present invention, the user interface 102 is in the form of a rule editor that facilitates the one or more users to add, update, modify and delete the one or more rules. The user interface 102 provides various options such as, but not limited to, options for defining rule, defining rule type and scope, constructing a rule using one or more pre-stored functions, checking syntax, checking semantics, providing message description and registering rules. In an embodiment of the present invention, the rule editor has one or more windows such as, but not limited to, rule manager window, rule editing window and new rule creation window for configuring the one or more rules. The information provided by the one or more users via the user interface 102 includes, but is not limited to, rule definition, rule type and scope, rule construct using the one or more pre-stored functions and message description associated with the rule. In an embodiment of the present invention, the information is provided by the one or more users using a functional programming language via the user interface 102. The user interface 102 facilitates the one or more users to construct the one or more rules using the one or more pre-stored functions. The one or more pre-stored functions are a set of library functions associated with the functional programming language.

In an embodiment of the present invention, the one or more users define the rule that needs to be configured in the system 100 via the user interface 102. The rule definition is a statement that describes the best practice and coding standard. In an embodiment of the present invention, the rule can be set as either mandatory or optional via the user interface 102. If the rule definition is set as optional, then it is considered as a recommended practice. If the rule definition is set as mandatory, then the best practice statement cannot be ignored and associated rule should be used to validate the database code.

The one or more users also provide the scope of the one or more rules via the user interface 102 for configuring the one or more rules. In an embodiment of the present invention, the user interface 102 provides options to the one or more users to define the rule scope as a program, a block or a statement. In an embodiment of the present invention, when the user selects the rule scope as the program, the rule is applied to the entire database code during validation. In an embodiment of the present invention, when the user selects the rule scope as block, the rule is applied to one or more sections of database code. Further, the one or more sections of the database code may include, but not limited to, declaration blocks, execution blocks and exception blocks. In an embodiment of the present invention, when the user selects the rule scope as statement, then the rule is applied to one or more statements within the database code. Further, different type of statements within the database code include, but not limited to, dynamic SQLs, If statements, Goto statements, loop, select, insert, update and delete. The user interface 102 also provides a tree like structure to facilitate the one or more users to define the applicability of the one or more rules.

The one or more users further define the rule type via the user interface 102. The rule type defines one or more target objects within the rule scope where the rule is to be applied. In an embodiment of the present invention, the one or more target objects include, but not limited to, entire code covered by the rule scope, procedures, functions, parameters, variable declarations, select statements, insert statements, update statements, delete statements, a particular set of statements, exception, tables, application error statements, various loops, conditional statements, cursor and dynamic SQLs within the database code. In an embodiment of the present invention, the rule type is associated with a dummy code which is provided via the user interface 102 to facilitate the one or more users to understand how the rule being constructed will be applied during validation.

After defining the rule scope and rule type, the one or more users associate the rule with the one or more pre-stored functions that need to be executed during validation. The one or more pre-stored functions comprise one or more primitive functions and one or more derived functions. A primitive function is a basic function. A derived function is formed using the one or more primitive functions. In an embodiment of the present invention, the one or more pre-stored functions are categorized based on their domain and displayed along with their attributes and description via the user interface 102. In an embodiment of the present invention, the one or more pre-stored functions are also categorized based on their applicability and functionality in the form of, but not limited to, text functions, arithmetic functions, statistical functions, logical functions, set functions and lookup functions. In an embodiment of the present invention, various text functions include, but are not limited to, IfExists function, IfExists range function, Findall function, Findrecursive function, GetValue function, Find function, Crop function, SubStr function, Compare function, Concat function, Split function, Prefix function, Suffix function, Contains function and IndexOf function. In an embodiment of the present invention, various arithmetic functions include, but not limited to, Add function, Subtract function, Multiply function, Divide function, EqualTo function, GreaterThan function, LesserThan function, Value function, Count function and Count Range function. In an embodiment of the present invention, various logical functions include, but not limited to, If function, OR function, AND function, NOT function, FindIndex function and CreateArray function. In an embodiment of the present invention, various set functions include, but not limited to, Union function, UnionAll function, Intersect function, Minus function, and Cardinality function.

In an exemplary embodiment of the present invention, Find function is a primitive function. The Find function may be described as a boundary function which in operation returns a Boolean result. The Find function is used for finding a particular string within a numeric start position and numeric end position. Various parameters associated with the find function are search string, start position and end position. In an exemplary embodiment of the present invention, the Find function is represented as Find('*',1,3)=N. In operation, being a boundary function, the section of the database code where the function is applied is based on rule type. The Find function searches for the presence of '*' between start position 1 and end position 3. The function returns Y if '*' is found else it returns N.

In an embodiment of the present invention, once the one or more users provide all the information for configuring the one or more rules, the one or more users press the submit button provided on the user interface 102. On pressing the submit button, the information provided by the one or more users is forwarded to the rules registration module 104.

The rules registration module 104 registers the one or more configured rules based on the information provided by the one or more users via the user interface 102. The rules registration module 104 comprises a rules manager (not shown) that is configured to manage tasks related to adding, updating, enabling/disabling and registering of the one or more rules in the engine database 106.

The rules registration module 104 comprises a set of pre-stored functions associated with the functional programming language. In an embodiment of the present invention, the rules registration module 104 registers the one or more rules as a single function that is executed independently or as a set of functions that are executed in a particular sequence based on how the user has configured the one or more rules with the one or more pre-stored functions. In an embodiment of the present invention, the functional programming language provides two types of functions with respect to their output. The first one is a Boolean function where the operation on the database code returns a yes or no as output values. The second is a non-Boolean function where the result of operation on the database code depends on the nature of operation and the output values are not in the form of yes or no. In an embodiment of the present invention, the rules registration module 104 uses the principle of Boolean Satisfiability (SAT) to determine if the variables of a Boolean formula can be assigned in such a manner so as to make the Boolean formula evaluate to true. If no such assignment is possible then the Boolean formula evaluates to false. Using the Boolean SAT principle, the one or more rules are configured and registered in a manner that combination of the Boolean and the non-Boolean functions would always result in a Boolean output. Also, the Boolean SAT principle is used by the rules registration module 104 for model checking, automatic pattern recognition, combinational equivalence checking, automated theorem proving and software verification. In an embodiment of the present invention, the rules registration module 104 comprises a rules interpreter (not shown) which is configured to check sanity of the one or more rules configured by the one or more users. The rules interpreter (not shown) ensures that the one or more configured rules follow SAT principle prior to registration in the system 100. The rules interpreter (not shown) also manages all the tasks related to rule processing and interpretation.

Once the one or more rules are configured, the one or more configured rules are stored in an engine database 108 via a persist manager 106. The persist manager 106 manages all tasks related to database operations such as, but not limited to, writing to and reading from the engine database 108. The engine database 108 acts as a repository for volatile and complex processing of data. In an embodiment of the present invention, the one or more rules registered in the engine database 108 can be accessed by the one or more users via the rule manager window of the rule editor.

Once registered in the system 100, the one or more registered rules can be used for validating the database code. For validating the database code, the one or more users access the user interface 102. The user interface 102 comprises a source selector (not shown) that provides options to the one or more user to select one or more sources (not shown) from where the database code is to be fetched for validation. The one or more sources include DBMSs such as, but not limited to, DBMSs language editors, Relational Database Management Systems (RDBMSs), non-relational databases and other large databases such as, but not limited to, Teradata and Hadoop. In an embodiment of the present invention, the system 100 is integrated with the one or more DBMSs. Further, each of the one or more DBMS language editors has its own proprietary programming language for writing the database code, although the basic construct and structure of the database code may be similar for different language editors. In an embodiment of the present invention, the one or more users select the one or more sources (not shown) from a database server. In another embodiment of the present invention, the one or more users select the one or more sources (not shown) from a file system. After selecting the one or more sources (not shown), the one or more users select an option provided by the user interface 102 to initiate validation of the database code associated with the one or more selected sources (not shown). The source selector (not shown) then communicates with the source manager 110 for fetching the database code.

The source manager 110 is configured to fetch the database code from the one or more selected sources and send the fetched code to the parser manager 112. The source manager 110 also updates the one or more selected sources after fetching the database code. In an embodiment of the present invention, the source manager 110 is capable of fetching the database code from, but not limited to, one or more file systems and database servers.

The parser manager 112 is configured to manage all tasks related to parsing of the fetched database code based on type of source from which the database code is fetched. The parser manager 112 acts as an abstraction layer independent of the type of data source selected by the one or more users. In an embodiment of the present invention, the parser manager 112 acts as an interface between third party parsers and the system 100. Further, the parser manager 112 is configured to receive the database code from all the selected sources and forward the fetched database code to the one or more parsers 114 specifically designed for a particular source. In an exemplary embodiment of the present invention, as the programming languages used for the various DBMSs often have a commonality of structure and syntax, the parser manager 112 acts as a common platform configured to receive the fetched database code from the one or more sources (not shown). The parser manager 112 captures the generic database features and merges the same with a set of source specific functionalities provided by the one or more parsers 114 for the one or more sources.

The one or more parsers 114 are configured to parse the fetched database code. Each of the one or more parsers 114 are designed for a specific source (not shown). The one or more parsers 114 parse the fetched database code by segmenting the code into one or more sections and assigning identification tokens to the each of the one or more sections. Further, assigning the identification tokens to the one or more sections facilitate in identifying and fetching the one or more registered rules that are to be applied to the parsed code. In an embodiment of the present invention, the system 100 comprises a single parser (not shown) configured to parse the SQLs that are embedded in the application codes. Once parsing of the fetched database code is complete, the validation manager 116 initiates tasks for validating the parsed code.

The validation manager 116 is configured to manage all the tasks related to validation based on the selected source from which the parsed code was fetched. The validator 118 is configured to validate the parsed code using the one or more registered rules. In an embodiment of the present invention, validating the parsed code comprises identifying one or more sections of the parsed code on which the one or more registered rules are to be applied based on the rule scope and the rule type. Once the one or more sections have been identified, the one or more functions associated with the one or more registered rules are applied to the one or more identified sections. In an embodiment of the present invention, the validator 118 identifies the section of the parsed code that is to be validated using a token associated with the rule scope of each of the one or more configured rules. If the token associated with the rule scope is same as the identification token assigned to a specific section of the database code, then the rule is applied to the that specific section of the database code. On application of the registered rule, the one or more pre-stored functions associated with the rule are executed on the specific section for validating the database code of the specific section.

The validator 118 communicates with the transaction database 120 for storing results of the validation of the parsed code. In an embodiment of the present invention, the results of the validation comprise at least one of: bugs, errors, defects, flaws and faults in the validated code. The transaction database 120 is a centralized repository for persistent transaction data of the system 100 and stores the results of the validation provided by the validator 118. The transaction database communicates with the derivative manager 122 via the persist manager 106.

The derivative manager 122 is designed to manage complex processing of the results of the validation of the parsed code and is further configured to provide the processed results of the validation to the report manager 124.

The report manager 124 is configured to receive the processed results of the validation from the derivative manager 122 and is further configured to render the received results as meaningful information to the one or more users via the user interface 102. The report manager 124 further manages all tasks related to reporting of the results of the validation. The report manager 124 renders the processed results of the validation in the form of, but not limited to, one or more reports, pivot table analysis, trend analysis, dashboard view, charts, graphs, statistics, error warnings, error location in the code and informational messages. In an embodiment of the present invention, the report manager 124 displays the results of the validation in a validation result window (not shown) of the user interface 102 using the message description associated with the one or more configured rules. The one or more users after viewing the results of the validation may change the database code to fix the errors and bugs displayed on the validation result window (not shown). Timely correction of bugs and errors in the database code facilitates analysis of rules violations by various teams and also facilitates in reducing possibility of error and rework by trend analysis.

The milestone manager 126 is configured to manage all tasks related to milestones associated with the software development lifecycle. In an embodiment of the present invention, the database code is automatically validated at certain pre-set intervals or milestones and provided to the one or more users in the form of milestone trend analysis. The milestone trend analysis facilitates the one or more users in ensuring improvement in the coding standards and quality compliance at various stages of the software development lifecycle.

The quality management module 128 is configured to manage and ensure the quality of services provided by the system 100. The quality management module 128 maintains a log of all events and facilitates exception handling for the system 100.

The utility services module 130 is configured to provide different types of utility services to the system 100. The different types of utility services include, but not limited to, converting XML to data sets and providing line counts and date and time formats to various modules of the system 100.

The data service 132 is configured to manage all data retrieval processes of the system 100. The data service 132 also provides important data control points to the system 100 for processing and analysis.

The user manager 134 is configured to manage access to the system 100. The user manager 134 is further configured to authenticate the one or more users prior to providing access to the system 100 using pre-stored authentication information pertaining to each of the one or more users.

Figure 2A:
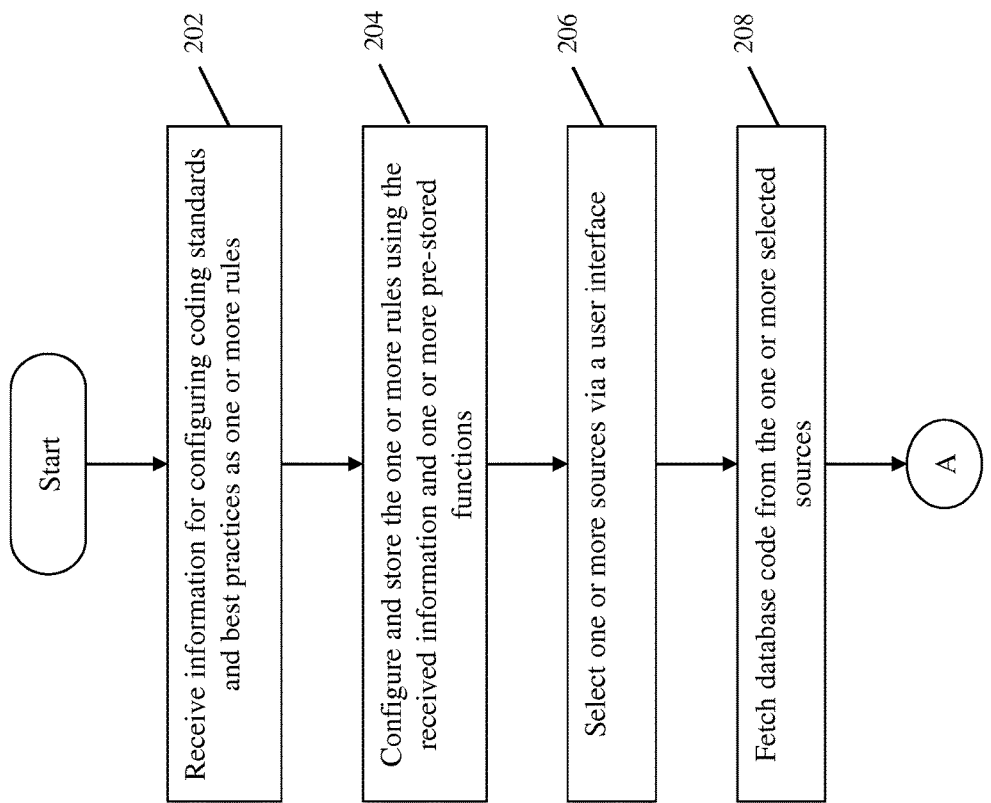
FIGS. 2A and 2B represent a flowchart illustrating a method for ensuring code quality compliance for various database management systems, in accordance with an embodiment of the present invention.
Figure 2B:
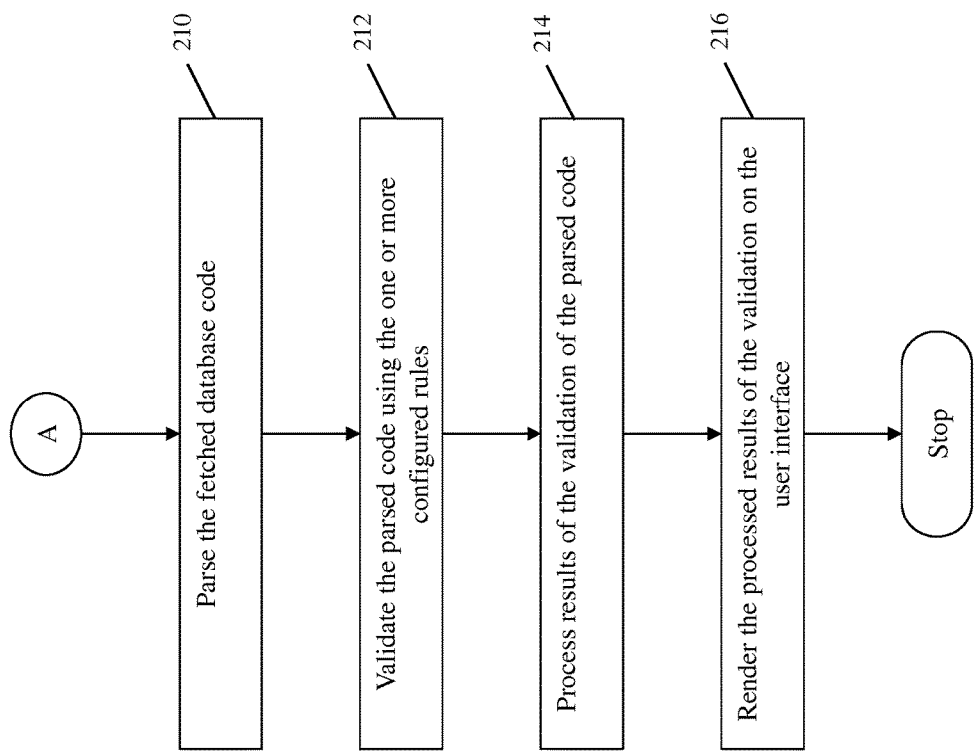

FIGS. 2A and 2B represent a flowchart illustrating a method for ensuring code quality compliance for various database management systems, in accordance with an embodiment of the present invention.

At step 202, information for configuring coding standards and coding best practices is received from one or more users via a user interface. The received information is used for configuring the coding standards and coding best practices as one or more rules via the user interface. In an embodiment of the present invention, the information provided by the one or more users includes, but is not limited to, rule definition, rule type and scope, rule construct using one or more pre-stored functions and message description associated with the rule. The coding standards and the coding best practices originate by analyzing bugs and errors that were generated when previously written codes were implemented. On analysis, the bugs and errors are correlated to specific coding practices. The coding standards and the coding best practices are then recommended to overcome the analyzed bugs and errors in code. In an embodiment of the present invention, the one or more users include, but not limited to, Chief Technical Officer (CTO), system architects, Information Technology (IT) managers and project managers of an organization developing software applications who wish to ensure that coding standards and best practices are followed while writing code.

In an embodiment of the present invention, the code includes, but is not limited to, database code used for interacting with one or more databases. The one or more databases include, but not limited to, one or more Database Management Systems (DBMSs). Further, DBMS language editors facilitate developers to write the database code. In an embodiment of the present invention, the one or more DBMSs include, but not limited to, Oracle, SQL server, Sybase and DB2.

At step 204, the one or more rules are configured using the received information and one or more pre-stored functions. In an embodiment of the present invention, the information provided by the one or more users is processed to configure the one or more rules by a rules registration module. The rules registration module comprises a set of pre-stored functions associated with the functional programming language using which the one or more rules are configured. The one or more pre-stored functions are used for constructing the one or more rules. The type and scope of the rules to be applied to the database code is defined by the one or more users. The one or more pre-stored functions comprise one or more primitive functions and one or more derived functions. A primitive function is a basic function. A derived function is formed using the one or more primitive functions. In an embodiment of the present invention, the rules registration module facilitates the one or more users to configure, via the user interface, the one or more rules as a single function executed independently or a set of functions that are executed in a particular sequence. Further, the functional programming language provides two types of functions with respect to their output. The first one is a Boolean function where the operation on the database code returns a yes or no as output values. The second is a non-Boolean function where the result of operation on the database code depends on the nature of operation and the output values are not in the form of yes or no.

In an embodiment of the present invention, Boolean Satisfiability (SAT) principle is used for validating the database code using the configured one or more rules. The Boolean SAT principle is applied to determine if the variables of a Boolean formula can be assigned in such a manner so as to make the Boolean formula evaluate to true otherwise if no such assignment is possible then the Boolean formula evaluates to false. Using the Boolean SAT principle, the one or more rules can be configured in a manner that is a combination of the Boolean and the non-Boolean functions and would always result in a Boolean output.

Once the one or more rules are configured, the one or more configured rules are registered in a repository and can be used for validating the database code. In an embodiment of the present invention, the one or more configured rules stored in the repository are accessed by the one or more users via a rule manager window of the rule editor.

At step 206, the one or more users select one or more sources via the user interface. The one or more sources include DBMSs such as, but not limited to, Relational Database Management Systems (RDBMSs), non-relational databases and other large databases such as, but not limited to, Teradata and Hadoop. In an embodiment of the present invention, the user interface comprises a source selector that provides options to the one or more user to select the one or more sources from where the database code is to be fetched for validation. In an embodiment of the present invention, the one or more users select the one or more sources from a database server. In another embodiment of the present invention, the one or more users select the one or more sources from a file system.

At step 208, the database code from the one or more selected sources is fetched. In an embodiment of the present invention, a source manager is configured to fetch the database code from the one or more selected sources.

At step 210, the fetched database code is parsed. In operation, the fetched database code is sent to a parser manager by the source manager. The parser manager is an abstraction layer configured to receive the database code from all the selected sources and forward the fetched database code to one or more parsers specifically designed for a particular source. The one or more parsers then parse the fetched database code to segment the fetched database code into one or more sections and assign identification tokens to the one or more sections. Further, assigning identification tokens to the one or more sections facilitate in application of the one or more registered rules.

At step 212, the parsed code is validated using the one or more registered rules. The step of validating the parsed code comprises identifying one or more sections of the parsed code on which the one or more registered rules are to be applied based on the rule scope and the rule type of the one or more registered rules. The one or more functions associated with the one or more registered rules are then applied on the one or more identified sections to validate the parsed code.

In an embodiment of the present invention, the section of the parsed code that is to be validated is identified using a token associated with the rule scope of each of the one or more registered rules. If the token associated with the rule scope is same as the identification token assigned to a specific section of the database code, then the rule is applied to that specific section of the database code. On application of the rule, the one or more pre-stored functions associated with the rule are executed on the specific section for validating the database code of the specific section.

At step 214, results of the validation of the parsed code are processed. The results of the validation are processed to convert the results into meaningful information for the one or more users.

At step 216, the processed results of the validation are rendered on the user interface. In an embodiment of the present invention, the results of the validation comprise at least one of: bugs, errors, defects, flaws and faults in the validated code. The results of the validation are rendered in the form of, but not limited to, one or more reports, pivot table analysis, trend analysis, dashboard view, charts, graphs, statistics, error warnings, error location in the code and informational messages. The results of the validation are used by the one or more users for ensuring code quality compliance.

In an embodiment of the present invention, the database code is automatically validated at certain pre-set intervals or milestones and provided to the one or more users in the form of milestone trend analysis. The milestone trend analysis facilitates the one or more users in ensuring improvement in the coding standards and quality compliance at various stages of the software development lifecycle.

Figure 3:
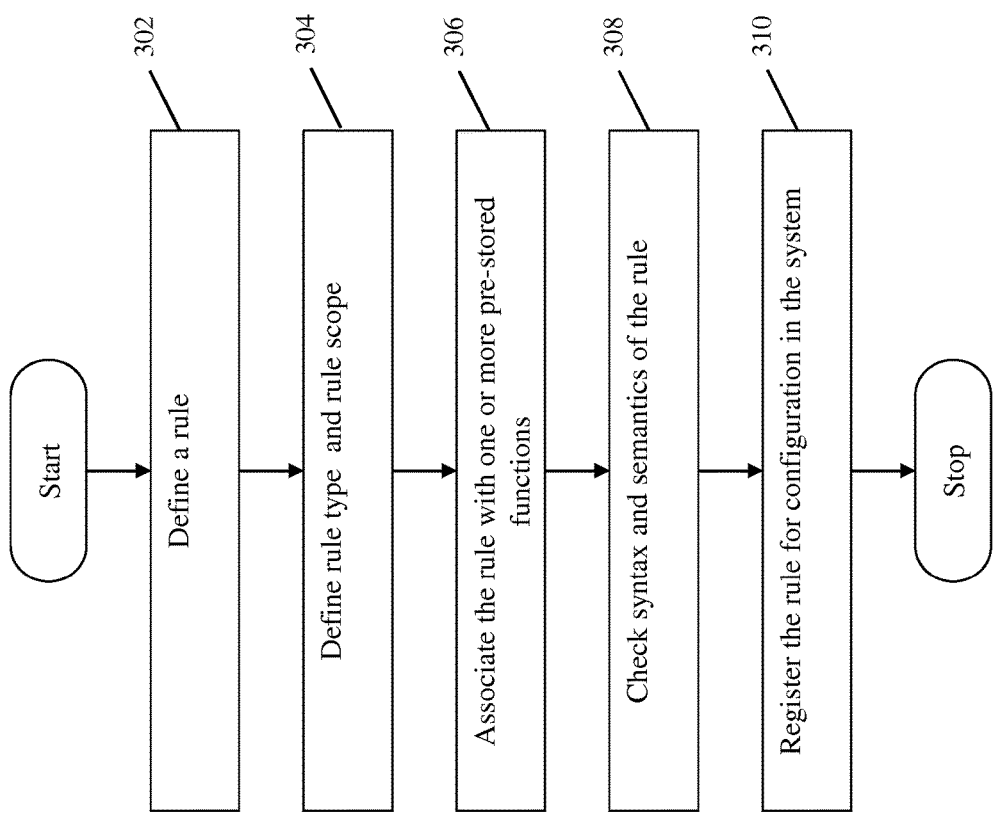
FIG. 3 is a detailed flowchart illustrating a method for configuring a rule, in accordance with an embodiment of the present invention.

FIG. 3 is a detailed flowchart illustrating a method for configuring a rule, in accordance with an embodiment of the present invention.

At step 302, the one or more users, via the user interface, define a rule which is to be configured for validating the database code. The rule definition is a statement that describes the best practice and coding standard. In an embodiment of the present invention, the rule definition can be set as either a guideline or a mandate via the user interface. If the rule definition is set as a guideline, then the rule is considered as a recommended practice and may or may not be applied to the database code. If the rule definition is set as a mandate, then the rule being defined has to be applied to validate the database code.

At step 304, rule scope and rule type is defined for configuring the rule via the user interface. In an embodiment of the present invention, the user interface provides options to the one or more users to define the rule scope as a program, a block or a statement. In an embodiment of the present invention, when the user selects the rule scope as the program, the rule is applied to the entire database code during validation. In an embodiment of the present invention, when the user selects the rule scope as block, the rule is applied to a particular section of database code. Further, the one or more sections of the database code may include, but not limited to, declaration block, execution block and exception block. In an embodiment of the present invention, when the user selects the rule scope as statement, then the rule is applied to one or more statements within the database code. Further, different type of statements within the database code include, but not limited to, dynamic SQLs, conditional statements, loop statements, select, insert, update and delete.

In an embodiment of the present invention, the rule type defines one or more target objects within the rule scope where the rule is to be applied. In an embodiment of the present invention, the one or more target objects include, but not limited to, entire code covered by the rule scope, procedures, functions, parameters, variable declarations, select statements, insert statements, update statements, delete statements, a particular set of statements, exception, tables, application error statements, various loops, conditional statements, cursor and dynamic SQLs within the database code.

At step 306, the one or more users associate the rule with one or more pre-stored functions. The one or more pre-stored functions are used to construct the rule. The one or more functions are stored using a functional programming language.

At step 308, the one or more users check the semantics and syntax of the rule. In an embodiment of the present invention, the rule editor provides a syntax check button and semantic check button. The one or more users can submit only a syntactically correct rule. In an embodiment of the present invention, the semantic check is performed against a dummy code. The dummy code is provided by the rule editor in the static code window.

At step 310, the one or more users register the rule for configuration. In an embodiment of the present invention, the one or more users submit the rule for registration by clicking on a submit button provided by the rule editor. Once submitted, the rule can be accessed and modified via the rule manager window of the rule editor. Further, the rule is then available for validation of the database code.

Figure 4:
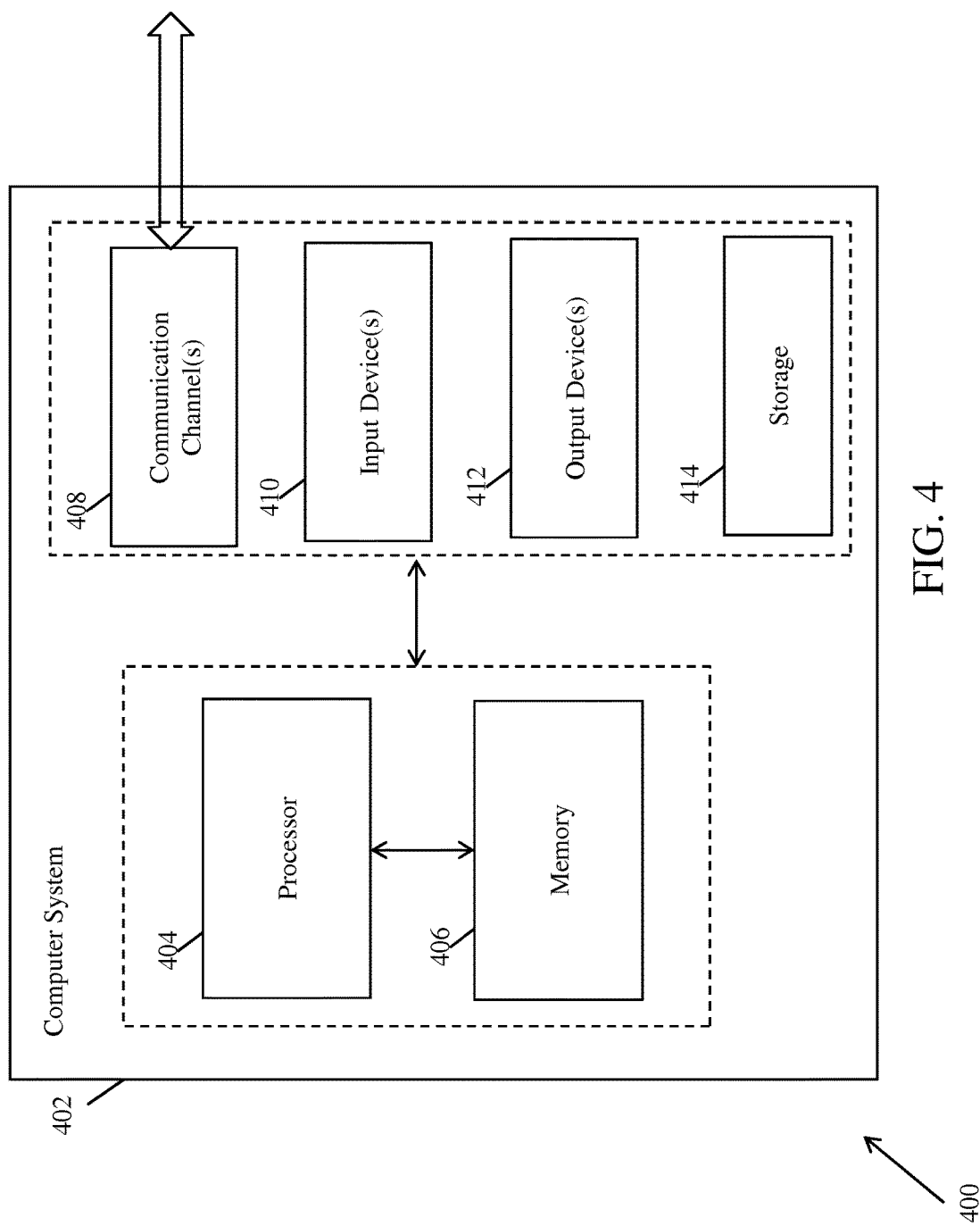
FIG. 4 illustrates an exemplary computer system for ensuring code quality compliance for various database management systems, in accordance with an embodiment of the present invention.

FIG. 4 illustrates an exemplary computer system for ensuring code quality compliance for various database management systems, in accordance with an embodiment of the present invention.

The computer system 402 comprises a processor 404 and a memory 406. The processor 404 executes program instructions and may be a real processor. The processor 404 may also be a virtual processor. The computer system 402 is not intended to suggest any limitation as to scope of use or functionality of described embodiments. For example, the computer system 402 may include, but not limited to, a general-purpose computer, a programmed microprocessor, a micro-controller, a peripheral integrated circuit element, and other devices or arrangements of devices that are capable of implementing the steps that constitute the method of the present invention. In an embodiment of the present invention, the memory 406 may store software for implementing various embodiments of the present invention. The computer system 402 may have additional components. For example, the computer system 402 includes one or more communication channels 408, one or more input devices 410, one or more output devices 412, and storage 414. An interconnection mechanism (not shown) such as a bus, controller, or network, interconnects the components of the computer system 402. In various embodiments of the present invention, operating system software (not shown) provides an operating environment for various softwares executing in the computer system 402, and manages different functionalities of the components of the computer system 402.

The communication channel(s) 408 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, bluetooth or other transmission media.

The input device(s) 410 may include, but not limited to, a keyboard, mouse, pen, joystick, trackball, a voice device, a scanning device, or any another device that is capable of providing input to the computer system 402. In an embodiment of the present invention, the input device(s) 410 may be a sound card or similar device that accepts audio input in analog or digital form. The output device(s) 412 may include, but not limited to, a user interface on CRT or LCD, printer, speaker, CD/DVD writer, or any other device that provides output from the computer system 402.

The storage 414 may include, but not limited to, magnetic disks, magnetic tapes, CD-ROMs, CD-RWs, DVDs, flash drives or any other medium which can be used to store information and can be accessed by the computer system 402. In various embodiments of the present invention, the storage 414 contains program instructions for implementing the described embodiments.

The present invention may suitably be embodied as a computer program product for use with the computer system 402. The method described herein is typically implemented as a computer program product, comprising a set of program instructions which is executed by the computer system 402 or any other similar device. The set of program instructions may be a series of computer readable codes stored on a tangible medium, such as a computer readable storage medium (storage 414), for example, diskette, CD-ROM, ROM, flash drives or hard disk, or transmittable to the computer system 402, via a modem or other interface device, over either a tangible medium, including but not limited to optical or analogue communications channel(s) 408. The implementation of the invention as a computer program product may be in an intangible form using wireless techniques, including but not limited to microwave, infrared, bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as an apparatus, method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

We claim:

1. A system for ensuring code quality compliance for one or more database management systems, the system comprising:

a user interface configured to prompt one or more users to select one or more options and provide information for configuring one or more rules corresponding to coding standards and best practices, wherein the coding standards and the best practices are identified by analyzing historical bugs and errors generated due to implementation of historical codes, further wherein the information for configuring the one or more rules comprise at least one of: rule scope, rule type and one or more functions, further wherein the rule scope is customized by the one or more users according to their preferences as at least one of: a program, a block, and a statement;

a rules registration module configured to register the one or more configured rules in a repository for validation;

a source selector configured to provide options to the one or more users to select one or more database management systems;

a source manager configured to fetch database code from the one or more selected database management systems;

one or more parsers configured to parse the fetched database code;

a validator configured to validate the parsed code using the one or more registered rules, wherein validation comprises:

identifying one or more sections of the parsed code on which the one or registered rules are to be applied based on the rule scope and the rule type; and applying the one or more functions associated with the one or more registered rules to the one or more identified sections; and a report manager configured to provide results of the validation, via the user interface, to the one or more users.

2. The system of claim 1 wherein the one or more users are prompted to select the one or more options for: defining the rule type, defining the rule scope, constructing the one or more rules using the one or more functions, checking syntax, checking semantics, providing message description and registering rules.

3. The system of claim 1, wherein the database code is written by one or more developers developing one or more database centric applications for the one or more database management systems.

4. The system of claim 1, wherein the rule scope defines range within the database code to which a particular rule has to be applied and further wherein the rule scope comprises at least one of: entire database code, a block and a statement.

5. The system of claim 1, wherein the rule type defines one or more target objects within the database code for applying a particular rule.

6. The system of claim 1, wherein the rule type comprises at least one of: procedures, functions, parameters, variable declarations, select statements, insert statements, update statements, delete statements, a particular set of statements, exception, tables, application error statements, loops, conditional statements, cursor and dynamic Structured Query Languages (SQLs) within the database code.

7. The system of claim 1, wherein the one or more functions are a set of library functions that are pre-stored and are used by the one or more users for configuring the one or more rules via the user interface.

8. The system of claim 1, wherein the one or more functions include at least one of: text functions, arithmetic functions, lookup functions, logical functions, set functions and statistical functions.

9. The system of claim 1, wherein the results of the validation comprise at least one of: bugs, errors, defects, flaws and faults in the validated code.

10. The system of claim 1, wherein the results of the validation are provided to the one or more users in the form comprising at least one of: reports, pivot table analysis, trend analysis, dashboard view, charts, graphs, statistics, error warnings, error location in the code and informational messages.

11. The system of claim 1, wherein parsing the fetched database codes comprises: segmenting the fetched database code into the one or more sections and assigning identification tokens to each of the one or more sections, wherein the identification tokens facilitate in identifying the one or more sections of the parsed code on which the one or registered rules are to be applied.

12. A computer-implemented method for ensuring code quality compliance for one or more database management systems, via program instructions stored in a memory and executed by a processor, the computer-implemented method comprising:
prompting one or more users to select one or more options and provide information for configuring one or more rules corresponding to coding standards and best practices, wherein the coding standards and the best practices are identified by analyzing historical bugs and errors generated due to implementation of historical codes, further wherein the information for configuring the one or more rules comprise at least one of: rule scope, rule type and one or more functions, further wherein the rule scope is customized by the one or more users according to their preferences as at least one of: a program, a block, and a statement;
registering the one or more configured rules in a repository for validation;
providing options to the one or more users to select one or more database management systems;
fetching database code from the one or more selected database management systems;
parsing the fetched database code;
validating the parsed code using the one or more registered rules, wherein the step of validation comprises:
identifying one or more sections of the parsed code on which the one or registered rules are to be applied based on the rule scope and the rule type; and
applying the one or more functions associated with the one or more registered rules to the one or more identified sections; and
providing results of the validation to the one or more users.

13. The computer-implemented method of claim 12, wherein the one or more users are prompted to select the one or more options for: defining the rule type, defining the rule scope, constructing the one or more rules using the one or more functions, checking syntax, checking semantics, providing message description and registering rules.

14. The computer-implemented method of claim 12, wherein the database code is written by one or more developers developing one or more database centric applications for the one or more database management systems.

15. The computer-implemented method of claim 12, wherein the rule scope defines range of the database code within which a particular rule has to be applied and further wherein the rule scope comprises at least one of: entire database code, a block and a statement.

16. The computer-implemented method of claim 12, wherein the rule type defines one or more target objects within the database code for applying a particular rule.

17. The computer-implemented method of claim 12, wherein the rule type comprises at least one of: procedures, functions, parameters, variable declarations, select statements, insert statements, update statements, delete statements, a particular set of statements, exception, tables, application error statements, loops, conditional statements, cursor and dynamic Structured Query Languages (SQLs) within the database code.

18. The computer-implemented method of claim 12, wherein the one or more functions are a set of library functions that are pre-stored and are used by the one or more users for constructing the one or more rules.

19. The computer-implemented method of claim 12, wherein the one or more functions include at least one of: text functions, arithmetic functions, lookup functions, logical functions, set functions and statistical functions.

20. The computer-implemented method of claim 12, wherein the results of the validation comprise at least one of: bugs, errors, defects, flaws and faults in the validated code.

21. The computer-implemented method of claim 12, wherein the results of the validation are provided to the one or more users in the form comprising at least one of: reports, pivot table analysis, trend analysis, dashboard view, charts, graphs, statistics, error warnings, error location in the code and informational messages.

22. The computer-implemented method of claim 12, wherein the step of parsing the fetched database code comprises: segmenting the fetched database code into the one or more sections and assigning identification tokens to each of the one or more sections, wherein the identification tokens facilitate in identifying the one or more sections of the parsed code on which the one or registered rules are to be applied.

23. A computer program product for ensuring code quality compliance for one or more database management systems, the computer program product comprising:
a non-transitory computer-readable medium having computer-readable program code stored thereon, the computer-readable program code comprising instructions that when executed by a processor, cause the processor to:
prompt one or more users to select one or more options and provide information for configuring one or more rules corresponding to coding standards and best practices, wherein the coding standards and the best practices are identified by analyzing historical bugs and errors generated due to implementation of historical codes, further wherein the information for configuring the one or more rules comprise at least one of: rule scope, rule type and one or more functions, further wherein the rule scope is customized by the one or more users according to their preferences as at least one of: a program, a block, and a statement;
register the one or more configured rules in a repository for validation;
provide options to the one or more users to select one or more database management systems;
fetch database code from the one or more selected database management systems;
parse the fetched database code; validate the parsed code using the one or more registered rules, wherein the step of validation comprises:
identifying one or more sections of the parsed code on which the one or registered rules are to be applied based on the rule scope and the rule type; and
applying the one or more functions associated with the one or more registered rules to the one or more identified sections; and
provide results of the validation to the one or more users.

* * * * *